(12) United States Patent
Nakamura et al.

(10) Patent No.: US 7,038,415 B2
(45) Date of Patent: May 2, 2006

(54) MOTOR DRIVING DEVICE

(75) Inventors: Koji Nakamura, Toyohashi (JP); Manabu Nomura, Toyota (JP); Satoshi Yoshimura, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/786,135

(22) Filed: Feb. 26, 2004

(65) Prior Publication Data
US 2004/0178759 A1   Sep. 16, 2004

(30) Foreign Application Priority Data
Mar. 10, 2003   (JP) .............................. 2003-063644

(51) Int. Cl.
*H02H 7/08* (2006.01)

(52) U.S. Cl. ............... 318/471; 318/472; 318/473; 318/474; 318/477; 318/432; 318/434

(58) Field of Classification Search ................ 318/138, 318/254, 439, 700, 471–477, 264, 432–434; 388/800–811
See application file for complete search history.

(56) References Cited

U.S. PATENT DOCUMENTS

| | | | | |
|---|---|---|---|---|
| 3,697,863 A | * | 10/1972 | Kilner | 361/106 |
| 3,794,950 A | * | 2/1974 | Kilner | 338/23 |
| 4,536,423 A | * | 8/1985 | Travis | 428/14 |
| 4,851,743 A | * | 7/1989 | Schmerda et al. | 388/811 |
| 5,068,777 A | * | 11/1991 | Ito | 363/97 |
| 5,485,341 A | * | 1/1996 | Okado et al. | 361/98 |
| 5,530,788 A | * | 6/1996 | Saijima | 388/811 |
| 6,016,965 A | * | 1/2000 | Yoshimura et al. | 236/35 |
| 6,141,494 A | * | 10/2000 | Nishino et al. | 388/811 |
| 6,313,593 B1 | * | 11/2001 | Matsubara et al. | 318/434 |
| 6,703,803 B1 | * | 3/2004 | Ohiwa et al. | 318/138 |

FOREIGN PATENT DOCUMENTS

| | | | |
|---|---|---|---|
| JP | A-8-37789 | | 2/1996 |
| JP | A-10-229674 | | 8/1998 |
| JP | 10-271837 | * | 10/1998 |
| JP | A-2001-161065 | | 6/2001 |
| JP | 2004-274911 | * | 9/2004 |

* cited by examiner

*Primary Examiner*—Marlon T. Fletcher
*Assistant Examiner*—Tyrone Smith
(74) *Attorney, Agent, or Firm*—Posz Law Group, PLC

(57) ABSTRACT

A temperature sensor (33) detects the temperature of a MOS transistor (7), and a current detecting circuit (35) detects current flowing in the MOS transistor (7). When the voltage corresponding to the detected temperature or the voltage corresponding to the detected current is increased to a threshold value or more, an overheat state detecting signal and further switching signal is set to a high level. As a result, a switch circuit in a driving circuit (17) is turned on, and the gate resistance value becomes the parallel value of a resistor (25), and the PWM frequency in the PWM control circuit is lowered, whereby the switching loss of the MOS transistor (7) can be reduced under the state that the motor (2) is rotated.

18 Claims, 6 Drawing Sheets

MOTOR DRIVING DEVICE

CROSS REFERENCE TO RELATED APPLICATION

This application is based upon, claims the benefit of priority of, and incorporates by reference the contents of, Japanese Patent Application No. 2003-63644 filed on Mar. 10, 2003.

FIELD OF THE INVENTION

The present invention relates to a motor driving device for controlling a motor applied voltage by driving a semiconductor switching element in Pulse Width Modulation (PWM) mode.

BACKGROUND OF THE INVENTION

JP-A-8-37789 (Patent Document 1) discloses a control method for an AC motor in which a switching frequency is varied in accordance with the value of a smoothened DC power supply voltage, the rotational speed of the AC motor, a primary electrical angle frequency, the intensity of an output voltage to be supplied or the frequency value of the output voltage or output current. JP-A-10-229674 discloses a DC-DC converter for carrying out the control of reducing a switching frequency under an over-current condition. JP-A-2001-161065 discloses a switching power supply device in which the oscillation frequency of a PWM control means is continuously reduced as the load condition is reduced so that the power loss is minimized.

For example, in a fan motor driving device for supplying a desired voltage to a fan motor mounted in a vehicle by driving a semiconductor switching element in the PWM mode, the semiconductor switching element is overheated when the temperature of the environment surrounding the driving device is abnormally increased or the load torque of the fan motor is abnormally increased. In order to protect the semiconductor switching element from such an overheat state, there has been hitherto used a method of turning off the switching element on the basis of a signal from a temperature detecting sensor or current detecting sensor or reducing the duty ratio of PWM.

However, when the switching element is turned off, the fan motor is completely stopped and thus the blowing of cooling air is also stopped. Furthermore, even when the duty ratio of PWM is reduced, the rotational speed of the fan motor is reduced, and thus sufficient blowing of cooling air is unachieved. As a result, there occurs such a secondary trouble that a cooling target object is overheated or passengers are made to feel uncomfortable. That is, the fan motor is strongly required to be continuously operated with instructed output power.

SUMMARY OF THE INVENTION

The present invention has been implemented in view of the foregoing situation, and has an object to provide a motor driving device that can prevent a semiconductor switching element from being overheated or restore the semiconductor switching element from an overheat state without affecting the rotational speed of a motor.

According to a first aspect of the present invention, when a driving circuit drives a semiconductor switching element in a PWM mode according to a PWM signal generated by a PWM control unit, the voltage corresponding to the PWM duty of the PWM signal is applied to a motor to rotate the motor. In this case, an overheat state detecting unit outputs an overheat state detecting signal when the temperature of the semiconductor switching element exceeds a predetermined threshold value, so that the semiconductor switching element falls into an overheat state or a possible overheat state. Here, the "possible overheat state" is defined as a state under which the probability that the semiconductor switching element falls into the overheat state is higher than a threshold value.

The driving circuit makes the semiconductor switching element carry out the switching operation under plural driving states. When the overheat state detecting signal is output, the driving control unit controls the driving state of the driving circuit so that the rise time and fall time of the semiconductor switching element are shortened. Accordingly, during the period when the overheat state detecting signal is output, the switching loss of the semiconductor switching element can be reduced although the switching noise is increased, and the semiconductor switching element can be restored from the overheat state to the non-overheat state or the semiconductor switching element can be beforehand prevented from falling into the overheat state. According to this invention, the loss of the semiconductor switching element can be reduced under the state that the rotational speed of the motor is kept to an instructed value as much as possible, and thus there is an advantage that a secondary problem caused by reduction in rotational speed will rarely occur.

According to a second aspect of the present invention, when the overheat state detecting signal is output, the driving control unit controls the PWM control unit to reduce the PWM frequency, so that the switching loss of the semiconductor switching element can be further reduced. Furthermore, for example when a motor mounted in a vehicle is driven, disturbance to the radio frequency is suppressed by lowering the PWM frequency. Therefore, there can be expected an effect of suppressing noises which would increase if the rise time and fall time of the semiconductor switching element are shortened.

According to a third aspect of the present invention, the driving circuit may vary the resistance value of a gate resistor linked to the gate of the semiconductor switching element or the resistance value of a base resistor linked to the base of the semiconductor switching element to thereby vary the rise time and fall time of the semiconductor switching element.

According to a fourth aspect of the present invention, the temperature of the semiconductor switching element is detected by a temperature detecting unit, and an overheat state detecting signal is output during a period when the detected temperature exceeds a threshold value.

According to a fifth aspect of the present invention, the overheat state detecting unit detects current flowing in the semiconductor switching element by using a current detecting unit, and outputs the overheat state detecting signal during a period when the detected current exceeds a threshold value. As a result, in a pre-overheat stage where the probability that the semiconductor switching element is shifted to the overheat state is high, the loss of the semiconductor switching element can be reduced, and the shift to the overheat state can be prevented before it happens.

According to a sixth aspect of the present invention, the overheat state detecting unit detects a power supply voltage for applying a voltage to the motor by using a power supply voltage detecting unit, and outputs an overheat state detecting signal during a period when the detected power supply voltage exceeds a threshold value. There is a general tendency that the loss of the semiconductor switching element is increased as the power supply voltage is high. According to this aspect, the loss of the semiconductor switching element can be reduced at the pre-overheat stage where the probability that the semiconductor switching element is shifted to the overheat state is high, and the shift to the overheat state can be prevented before happens.

According to a seventh aspect of the present invention, the overheat state detecting unit outputs an overheat state detecting signal during a period when the duty ratio of PWM-driving operation exceeds a threshold value. As the duty ratio is larger, the motor applied voltage and the motor current are increased, and thus the loss of the semiconductor switching element is increased. According to this aspect, the loss of the semiconductor switching element can be reduced at the pre-overheat stage where the probability that the semiconductor switching element is shifted to the overheat state is high, and the shift to the overheat state can be prevented before happens.

According to an eighth aspect of the present invention, the overheat state detecting unit outputs an overheat state detecting signal having a hysteresis characteristic. Therefore, the driving state of the semiconductor switching element can be prevented from being frequently switched in the driving circuit, and thus more stable driving can be performed.

According to a ninth aspect of the present invention, a motor voltage is detected by a motor voltage detecting unit, and feed-back control is performed by the PWM control unit so that the motor voltage thus detected is coincident with an instructed motor voltage, whereby an instructed voltage can be applied to the motor even when a power supply voltage is varied.

According to a tenth aspect of the present invention, the loss of the semiconductor switching element can be reduced while keeping the air blowing power of the fan. Therefore, there is an advantage that a secondary problem caused by reduction in cooling effect of a heat exchanger in a vehicle cooling system occurs hardly.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Preferred embodiments according to the present invention will be described hereunder with reference to the accompanying drawings.

[First Embodiment]

A first embodiment according to the present invention will be described hereunder with reference to FIGS. 1 to 3.

Figure 1:
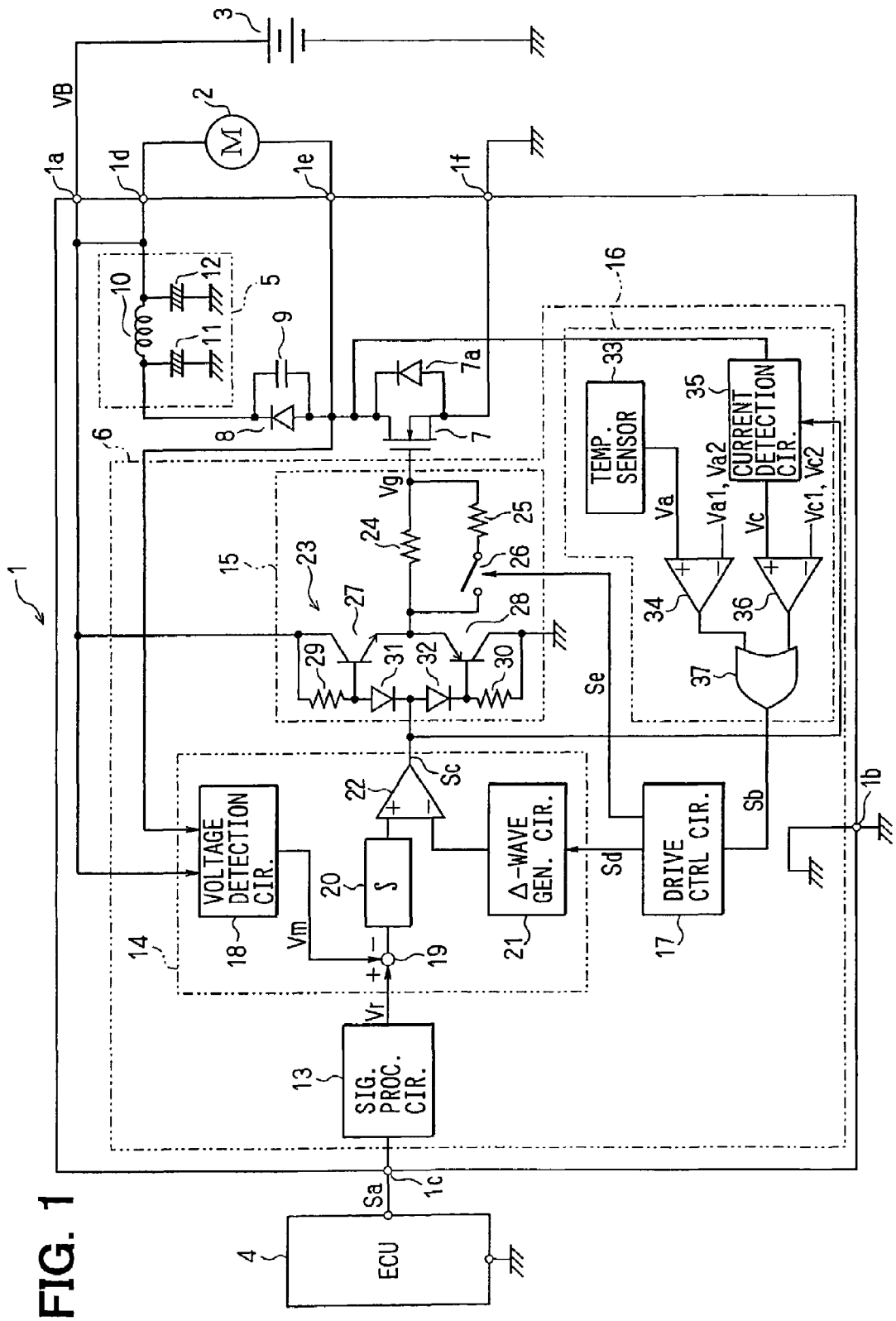
FIG. 1 is a circuit diagram of a motor driving device according to a first embodiment.

FIG. 1 shows the electrical construction of a motor driving device. A motor driving device 1 drives an air blowing fan motor 2 (hereinafter referred to as "motor 2") for a heat exchanger in a cooling system for a vehicle, and it operates with a battery voltage supplied as a power supply voltage VB from a battery 3 to terminals 1a, 1b thereof. An instruction-signal Sa is supplied from an engine ECU 4 (Electronic Control Unit) to a terminal 1c. This instruction signal Sa is the digital data corresponding to a voltage to be applied to the motor 2 or an analog voltage signal.

ECU 4 concentrically carries out plural control operations relevant to an engine such as fuel injection control, ignition timing control, idle rotational speed control, etc. As not shown, ECU 4 is supplied with a temperature signal of engine cooling water, an ON/OFF signal of a magnet clutch for transmitting engine driving force to the compressor of an air conditioner, a refrigerant pressure increasing signal indicating increase of the pressure of refrigerant of the air conditioner, etc., and it carries out the engine control and the rotation control of the motor 2 by using these signals.

A ceramic board and a smoothing circuit 5 are mounted in the motor driving device 1, an integrated circuit (IC) 6, an N-channel type MOS transistor 7 (corresponding to a semiconductor switching element), a circulating diode 8 and a snubber capacitor 9 are mounted on the ceramic board. The ceramic board is used to keep the IC 6 and the MOS transistor 7 in a closely thermally coupled state.

Terminals 1d and 1e are motor connection terminals, and the terminal 1d is connected to the terminal 1a in the motor driving device 1. A terminal 1f is a ground terminal for a power system, and the drain and source of the MOS transistor 7 are connected to the terminals 1e, 1f, respectively. Furthermore, a parasitic diode 7a having the polarity shown in FIG. 1 is connected to the MOS transistor 7 in parallel.

In the motor driving device 1, the diode 8 having the polarity shown in FIG. 1 and the smoothing circuit 5 are connected between the terminals 1e and 1d in series, and a capacitor 9 is connected to the diode 8 in parallel. The smoothing circuit 5 is equipped with a π-filter comprising a reactor 10 and electrolytic capacitors 11, 12. The smoothing circuit 5 and the capacitor 9 have the function of absorbing noises occurring at the switching time of the MOS transistor 7.

The IC 6 has an input signal processing circuit 13 for processing an instruction signal Sa, a PWM control circuit 14 for generating a PWM signal Sc, a driving circuit 15 for driving the MOS transistor 7, an overheat detecting circuit 16 for detecting the overheat state, etc. of the MOS transistor 7, and a driving control circuit 17 for controlling the PWM frequency and the driving state of the driving circuit 15. The construction of each circuit is as follows.

The input signal processing circuit 13 receives digital data (instruction signal Sa) transmitted from ECU 4 in a serial communication mode to generate an instruction motor voltage Vr. When the instruction signal Sa is transmitted in the form of an analog voltage, the input signal processing circuit 13 generates an instruction motor voltage Vr through level conversion or the like.

The PWM control circuit 14 (corresponding to the PWM control unit) is a feedback control circuit for controlling the PWM duty of the PWM signal Sc so that the motor voltage Vm applied to the motor 2 is coincident with the instruction motor voltage Vr. That is, the motor voltage detecting circuit 18 (corresponding to the motor voltage detecting unit)

detects the motor voltage Vm on the basis of the voltage applied between the terminals $1d$ (terminal $1a$) and the terminal $1e$, and a subtracter 19 outputs the voltage deviation corresponding to the subtraction voltage between the instruction motor voltage Vr and the motor voltage Vm. This voltage deviation is input to one input terminal of a comparator 22 through an integrator 20, and a triangular-wave signal output from a triangular wave generating circuit 21 is input to the other input terminal of the comparator 22.

The triangular wave generating circuit 21 generates a triangular-wave signal having a frequency corresponding to the resistance value (or capacitance value) in a CR charging/discharging circuit equipped therein. When a switching signal Sd supplied from the driving control circuit 17 is set to a low (L) level, the triangular wave generating circuit 21 outputs a triangular-wave signal having a frequency of 19 kHz, and when the switching signal Sd is set to a high (H) level, it outputs a triangular-wave signal having a frequency of 5 kHz.

Figure 6:
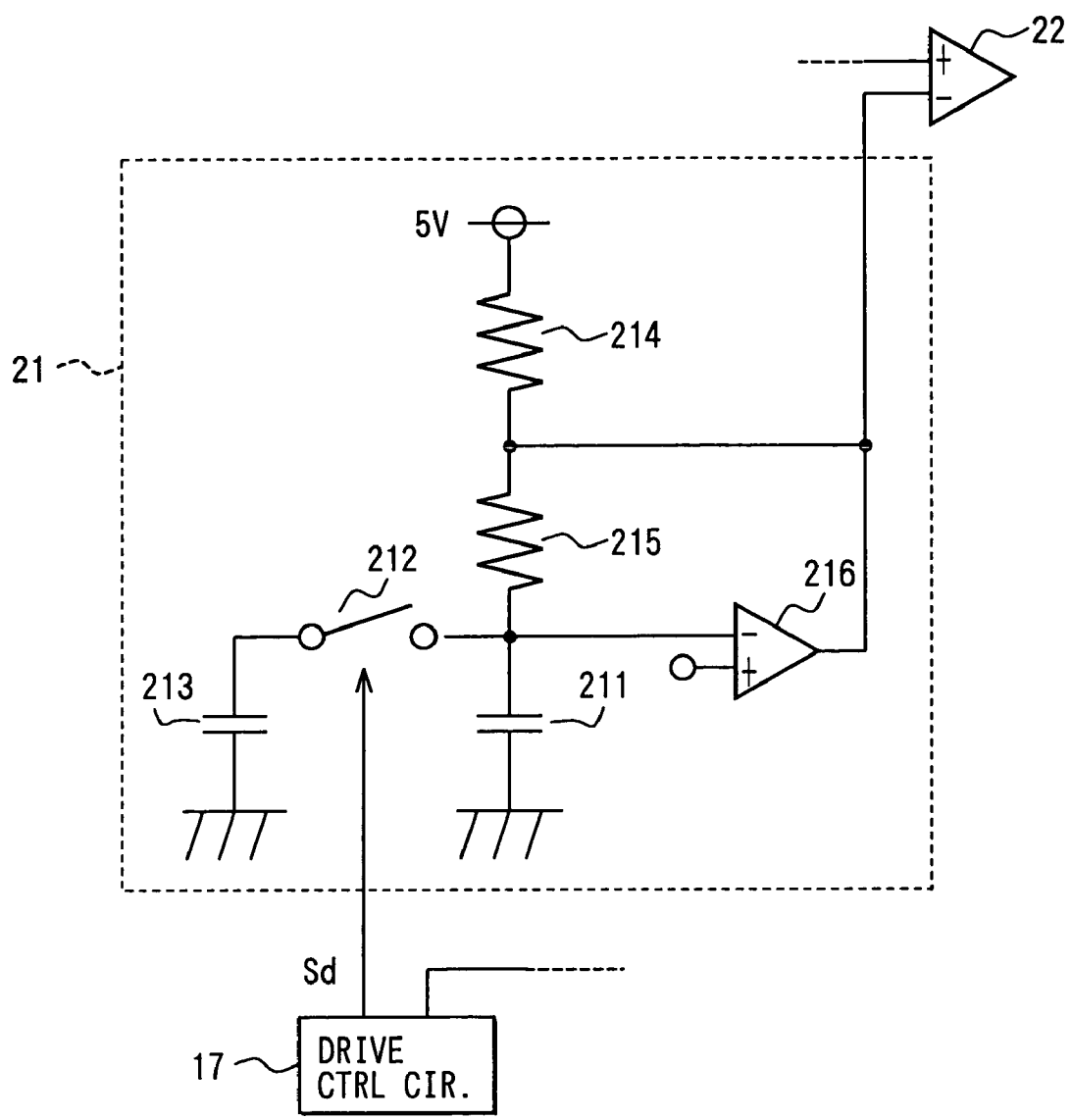
FIG. 6 is a circuit diagram of the triangular wave generation circuit.

Referring to FIG. 6, an exemplary implementation of the triangular wave generating circuit 21 will be discussed. This circuit 21 is for reducing the PWM frequency. It includes a capacitor 213 connected to another capacitor 211 in parallel through a switching element 212 which is opened/closed by the driving control circuit 17. Reference numerals 214, 215 represent resistors, and reference numeral 216 represents a comparator.

In the above-described embodiment, the PWM frequency during the output period of the overheat state detecting signal is set to be 5 kHz higher than the audible frequency band of the human beings. However, the PWM frequency may be set to be within the audible frequency band of the human beings (for example, 500 Hz for human perception) to use the PWM frequency as a buzzer sound. Accordingly, abnormality can be informed to a user with the sound.

Furthermore, in place of the above method, a method of increasing the current value of a constant-current circuit for charging/discharging the gate of the MOS transistor 7 may be used to vary the switching speed of the MOS transistor 7.

Returning to FIG. 1, the driving circuit 15 is a circuit for receiving the PWM signal Sc and outputting a gate voltage Vg to the MOS transistor 7, and comprises a push-pull circuit 23, gate resistors 24, 25 and a switch circuit 26. The push-pull circuit 23 of the driving circuit 15 comprises transistors 27, 28, resistors 29, 30 and diodes 31, 32, and has a commonly connected emitter of the transistors 27 and 28 as an output node Np.

A resistor 24 is connected between the output node Np and the terminal of the IC 6 connected to the gate of the MOS transistor 7. An in-series circuit of a resistor 25 and a switch 26 is connected to the resistor 24 in parallel. The switch circuit 26 comprises a transistor, for example. The switch circuit 26 is turned off when a switching signal Se supplied from the driving control circuit 17 thereto is set to an L level, and turned on when the switching signal Se is set to an H level.

The overheat detecting circuit 16 (corresponding to the overheat state detecting unit) sets the overheat state detecting signal Sb from L level (normal state) to H level (overheat state) when the temperature of MOS transistor 7 actually exceeds a threshold value and is in an overheat state or when an over current flows in the MOS transistor 7 and the probability that the semiconductor will be in the overheat state in the near future is high, although it is not in the overheat state at that present time.

More particularly, a temperature sensor 33 (corresponding to the temperature detecting unit) for outputting the voltage Va corresponding to the detected temperature T is equipped in the IC 6. The temperature sensor 33 directly detects the temperature T of the IC 6 concerned. However, as described above, the IC 6 and the MOS transistor 7 are closely thermally joined to each other through the ceramic board, so that the temperature sensor 33 can substantially detect the temperature T of the MOS transistor 7. The temperature sensor may be equipped to be located out of the IC 6 and in the vicinity of the MOS transistor 7. Alternatively, it may be equipped in the MOS transistor 7.

The voltage Va is input to the non-inverting input terminal of the comparator 34, and a threshold voltage Va1 or Va2 is input to the inverting input terminal of the comparator 34. The threshold voltages Va1 and Va2 correspond to the temperature T1, T2 (T1>T2), respectively. The comparator 34 compares the voltage Va with the threshold voltage Va1 when the output thereof is set to L level (overheat non-detected state), and compares the voltage Va with the threshold voltage Va2 when the output thereof is set to an H level (overheat detected state), whereby a hysteresis comparator is implemented.

Furthermore, the current detecting circuit 35 (corresponding to the current detecting unit) detects the drain-source voltage VDS of the MOS transistor 7 on the basis of the PWM signal Sc when the MOS transistor 7 is turned on, thereby outputting the voltage Vc corresponding to the current flowing in the MOS transistor 7.

The voltage Vc is input to the non-inverting input terminal of a comparator 36, and threshold voltages Vc1, Vc2 are input to the inverting input terminal of the comparator 36. The threshold voltages Vc1, Vc2 correspond to the current I1, I2 (I1>I2), respectively. The comparator 36 compares the voltage Vc with the threshold voltage Vc1 when the output thereof is set to L level (over-current non-detected state) and compares the voltage Vc with the threshold voltage Vc2 when the output thereof is set to H level (over-current detected state), whereby a hysteresis comparator is implemented.

The respective output signals of the comparators 34 and 36 are input to an OR gate 37, and the output signal of the OR gate 37 is set as the overheat state detecting signal Sb. The driving control circuit 17 (corresponding to the driving control unit) controls the switching signals Sd, Se so that the switching signals Sd, Se are set to L level when the overheat state detecting signal Sb is set to L level (normal state) and set to H level when the overheat state detecting signal Sb is set to H level (overheat state).

Next, the operation of this embodiment will be described with reference to FIGS. 2A–2B and 3.

When supplied with the power supply voltage VB from the battery 3, the motor driving device 1 controls the duty ratio of the PWM signal Sc with the PWM control circuit 14 so that the instruction motor voltage Vr supplied from the ECU 4 is coincident with the detected motor voltage Vm. The driving circuit 15 outputs the gate voltage Vg corresponding to the PWM signal Sc to the MOS transistor 7.

Since gate capacitance Cgd, Cgs exists in the MOS transistor 7, the driving state of the MOS transistor 7 is varied in accordance with the current driving capability of the push-pull circuit 23 or the resistance values of the gate resistance (resistors 24, 25). In general, as the resistance value of the gate resistance is reduced, the charging/discharging time of the gate capacitance Cgd, Cgs is shortened. Therefore, the rise time tr and fall time tf of the MOS transistor 7 at the switching time are shortened. Accordingly, for the same PWM frequency, the switching loss is more remarkably reduced and thus the increase of the temperature of the MOS transistor 7 can be more greatly suppressed in the case of the smaller resistance value of the gate resistance, that is, in the case where the switch circuit 26 is turned on and the gate resistance value is equal to the parallel value of the resistors 24 and 25.

Figure 3:
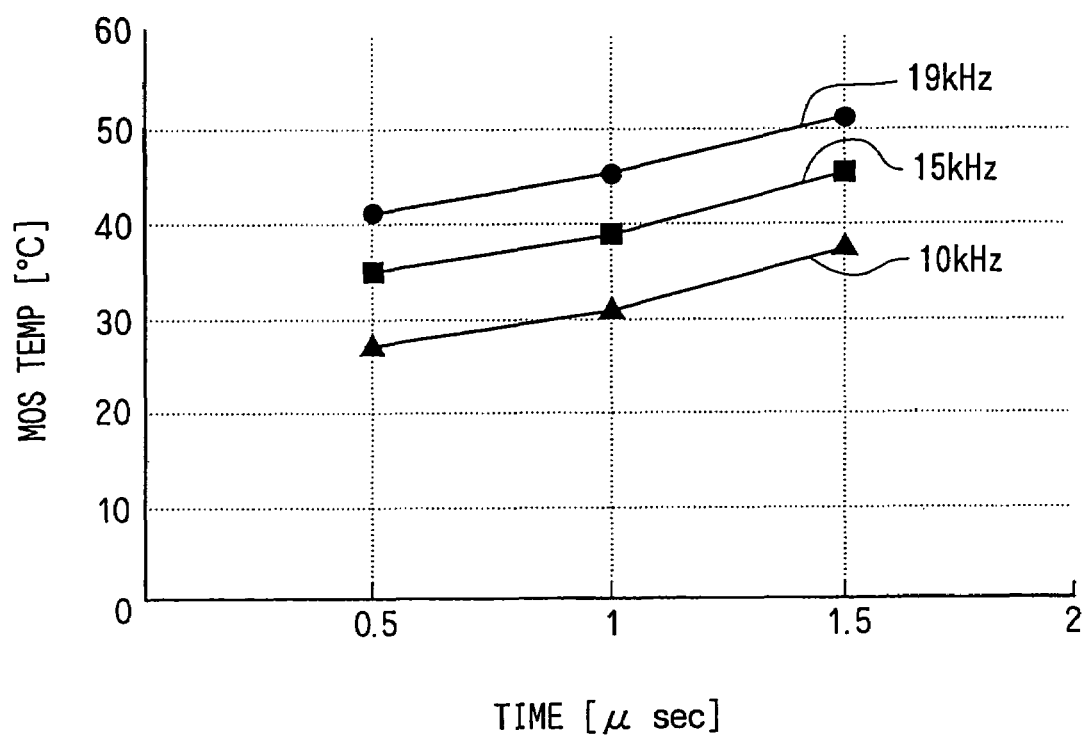
FIG. 3 is a graph showing a characteristic of the relationship between the rise time, fall time of the MOS transistor and the rising temperature.

FIG. 3 is a graph showing a measured characteristic of the relationship between the rise time tr (=the fall time tf) of the MOS transistor 7 and the increasing temperature of the MOS transistor 7 concerned. The three characteristic lines drawn on the graph are achieved for the PWM frequencies of 19 kHz, 15 kHz and 10 kHz respectively from the upper side of FIG. 3. The measurement was made under the condition that the power supply voltage VB was set to 15.1V, the rated capacitance of the motor 2 was set to 120 W, the motor voltage Vm was set to 9.6V and the motor current was set to 8 A.

As is apparent from FIG. 3, the temperature increase of the MOS transistor 7 can be suppressed to the low level by setting the resistance value of the gate resistance to a small value to shorten the rise time tr and the fall time tf. Furthermore, as is apparent from FIG. 3, as the PWM frequency is lower, the switching loss is reduced, so that the temperature increase of the MOS transistor 7 can be suppressed to the low level. As not shown, when the PWM frequency is set to 5 kHz, the temperature increase is further suppressed.

The PWM frequency is settled on the basis of the following four points.

(Lower Limit)

(1) It is preferable that the PWM frequency is set to be no less than the time constant (several kHz) determined by the inductance value and resistance value of the motor 2 on the basis of the brush abrasion of the motor 2, the heat generation of the motor 2 and the ripple component of current flowing in the motor 2.

(2) It is preferable that the PWM frequency is set to be not less than the audio frequencies of human beings so that magnetic sounds caused by the inductance component of the motor 2 are insensitive to the hearing of the human beings. However, as mentioned above, the frequency may be made to that of human sensitivity for generating a buzzer notification.

(Upper Limit)

(3) It is preferable that the PWM frequency is reduced at the maximum from the viewpoint of radio noises.

(4) It is preferable that the PWM frequency is reduced as the maximum from the viewpoint of the heat generation of the MOS transistor 7.

Figure 2A:
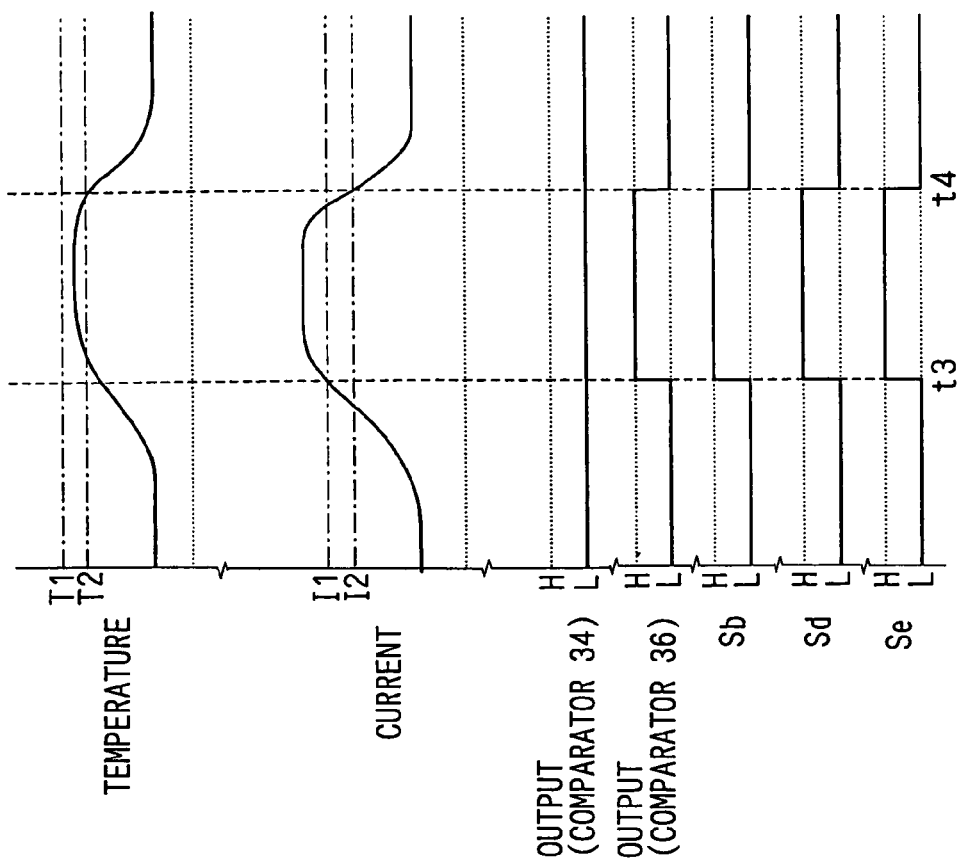
FIGS. 2A–2B are diagrams showing variation of each signal with temperature variation and current variation of an MOS transistor.
Figure 2B:
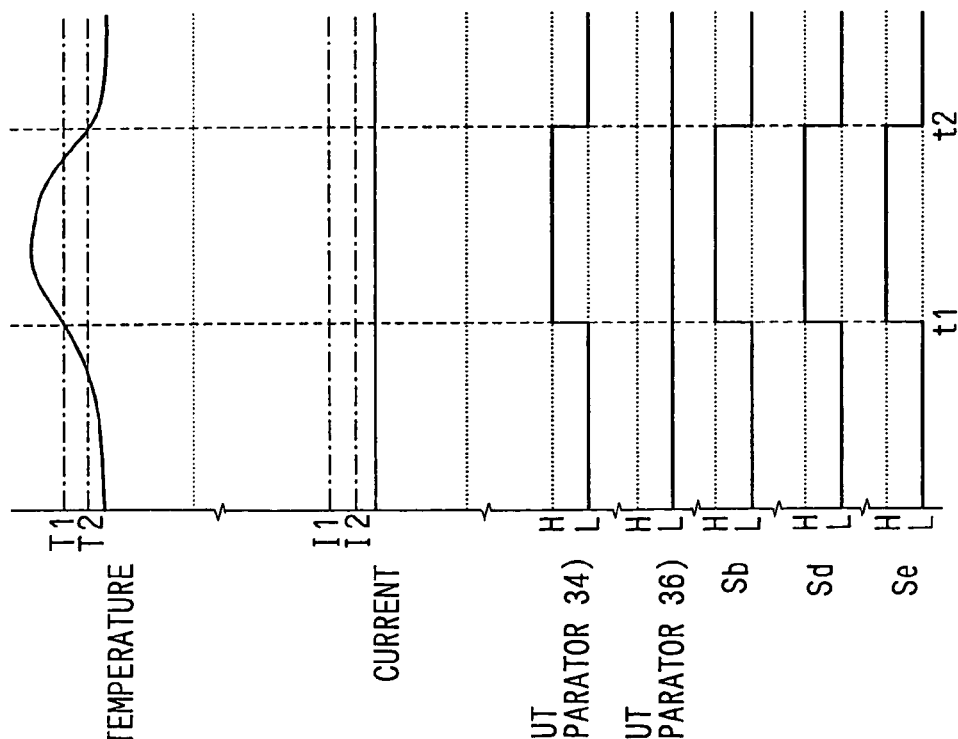

FIGS. 2A and 2B show the variation of each signal with respect to the variation of the temperature T and current I of the MOS transistor 7.

FIG. 2A shows a case where the motor current I is relatively large and the temperature T exceeds a threshold value T1 due to an increase in the temperature of the motor environment or the like, so that the MOS transistor 7 falls into an overheat state. FIG. 2B shows a case where the motor 2 temporarily falls into an overload state and the current I exceeds a threshold value I1, so that the MOS transistor 7 falls into an over-current state.

First, in FIG. 2A, the output signals of the comparators 34, 36 are set to a L level and the overheat state detecting signal Sb and the switching signals Sd, Se are set to a L level during a period (before the time t1) when the detected temperature T is lower than the threshold value T1. Therefore, the PWM frequency is set to 19 kHz, and only the resistor 24 contributes to the gate resistance in the driving circuit 15. Thereafter, when the detected temperature T reaches the threshold value T1 (time t1), the overheat state detecting signal Sb and the switching signals Sd, Se are set to a H level, the PWM frequency is reduced to 5 kHz and the gate resistance in the driving circuit 15 becomes the parallel resistance of the resistors 24 and 25.

As a result, the rise time tr and the fall time tf are shortened, and the switching loss is reduced in connection with the reduction of the PWM frequency, so that the increase of the temperature of the MOS transistor is suppressed. That is, even when the MOS transistor falls into the overheat state, the motor driving device 1 neither immediately stops the motor 2 nor immediately reduces the rotational speed of the motor 2, but it carries out the control so that the motor voltage Vm is equal to the instruction motor voltage Vr at the maximum and the MOS transistor 7 is restored from the overheat state with keeping the rotational speed of the motor 2. However, when the temperature T of the MOS transistor 7 continues to further increase, it may stop the motor 2 or reduce the rotational speed thereof. Thereafter, when the temperature T is reduced to the threshold value T2 or less, the PWM frequency is set to 19 kHz again, and only the resistor 24 contributes to the gate resistance in the driving circuit 15 (time t2).

When the motor current I reaches the threshold value I1 in FIG. 2B, the overheat state detecting signal Sb is set to H level irrespective of the arrival of the temperature T at the threshold value T1, so that the PWM frequency is reduced to 5 kHz and the gate resistance in the driving circuit 15 is equal to the parallel resistance of the resistors 24 and 25 (time t3). This is because the probability that the MOS transistor will fall into the overheat state in the future although it is not in the overheat state at present is high under the situation that the current I is equal to the threshold value I1 or more. That is, this is equivalent to the forecast that the MOS transistor will fall into the overheat state. As a result, the switching loss is reduced, and the temperature increase of the MOS transistor 7 is suppressed. Thereafter, when the current I is reduced to the threshold value I2, the PWM frequency is set to 19 kHz again, and only the resistor 24 contributes to the gate resistance in the driving circuit 15 (time t4).

As described above, the motor driving device 1 of this embodiment is equipped with the overheat detecting circuit 16 for detecting the overheat state of the MOS transistor 7. When the MOS transistor 7 actually falls into the overheat state or when the MOS transistor 7 falls into the over-current state, the gate resistance of the driving circuit 15 is reduced to shorten the rise time tr and the fall time tf at the switching time, and further reduce the PWM frequency.

Accordingly, the switching loss of the MOS transistor 7 can be reduced, and also the MOS transistor 7 can be restored from the overheat state to the non-overheat state or prevented from falling into the overheat state in advance. Furthermore, the applied voltage (rotational speed) of the motor 2 can be kept to the voltage corresponding to the instructed value (the instructed rotational speed) as much as possible. Therefore, there is an advantage that a secondary problem caused by reduction of the rotational speed of the motor 2, for example, reduction in cooling capability of the cooling system occurs hardly.

If the rise time tr and the fall time tf are shortened, it would be concerned that ringing at the switching time is intensified and thus switching noises (become radio noises) are increased. However, since the PWM frequency is lowered in combination of the shortening of the rise time tr and the fall time tf, the frequency band of the noises can be deviated from the radio frequency band, and thus the radio noise can be suppressed at maximum.

Since the overheat detecting circuit 16 outputs the overheat state detecting signal Sb having the hysteresis characteristic, the phenomenon (hunting phenomenon) that the gate resistance of the driving circuit 15 and the PWM frequency are frequently switched can be suppressed, and the stable driving operation can be performed.

The PWM control circuit 14 carries out the feedback control so that the detected motor voltage Vm is coincident with the instructed motor voltage Vr. Therefore, even when the power supply voltage VB is varied, the instructed voltage can be applied to the motor 2.

(Second Embodiment)

Figure 4:
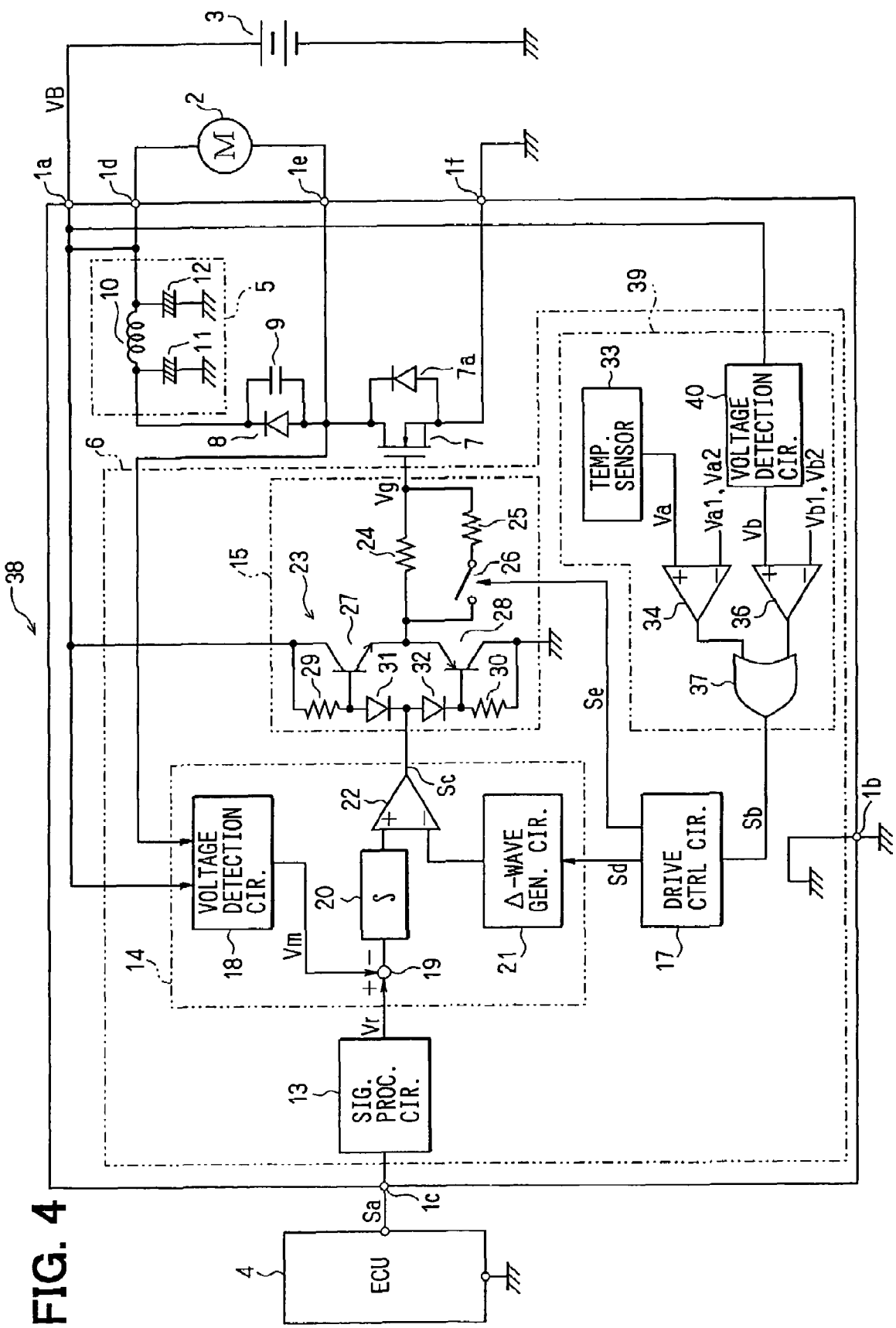
FIG. 4 is a circuit diagram of the motor driving device according to a second embodiment.

Next, a second embodiment according to the present invention will be described with reference to the circuit diagram of FIG. 4. In FIG. 4, the same constituent elements as FIG. 1 are represented by the same reference numerals. A motor driving device 38 shown in FIG. 4 is different from the motor driving device 1 shown in FIG. 1 in that the construction of the overheat detecting circuit 39.

The overheat detecting circuit 39 is equipped with a power supply voltage detecting circuit 40 (corresponding to the power supply voltage detecting unit) for dividing the power supply voltage VB input to the terminal 1a and then detecting the voltage thus divided. The voltage Vb corresponding to the power supply voltage VB is input to the non-inverting input terminal of the comparator 36, and threshold voltages Vb1, Vb2 are input to the inverting input terminal of the comparator 36. The threshold voltages Vb1, Vb2 correspond to the power supply voltages VB1, VB2 (VB1>VB2). The motor driving device 38 may be equipped with a current detecting circuit for detecting current flowing in the MOS transistor 7 for over-current protection.

There is a general tendency that as the power supply voltage is higher, the switching loss of the MOS transistor is increased. According to the motor driving device 38 of this embodiment, the overheat state detecting signal Sb is also set to H level to reduce the gate resistance of the driving circuit 15 and shorten the rise time tr and the fall time tf at the switching time, thereby further reducing the PWM frequency not only in the case where the overheat state of the MOS transistor is detected, but also in the case where the power supply voltage VB supplied from the battery 3 is equal to the threshold value VB1 or more.

As described above, in the overheat pre-stage where the probability that the MOS transistor 7 is shifted to the overheat state is high, the loss of the MOS transistor 7 is reduced, and thus the shift to the overheat due to increase of the power supply voltage VB can be prevented from occurring. The other operation and effect are the same as the first embodiment.

(Third Embodiment)

Figure 5:
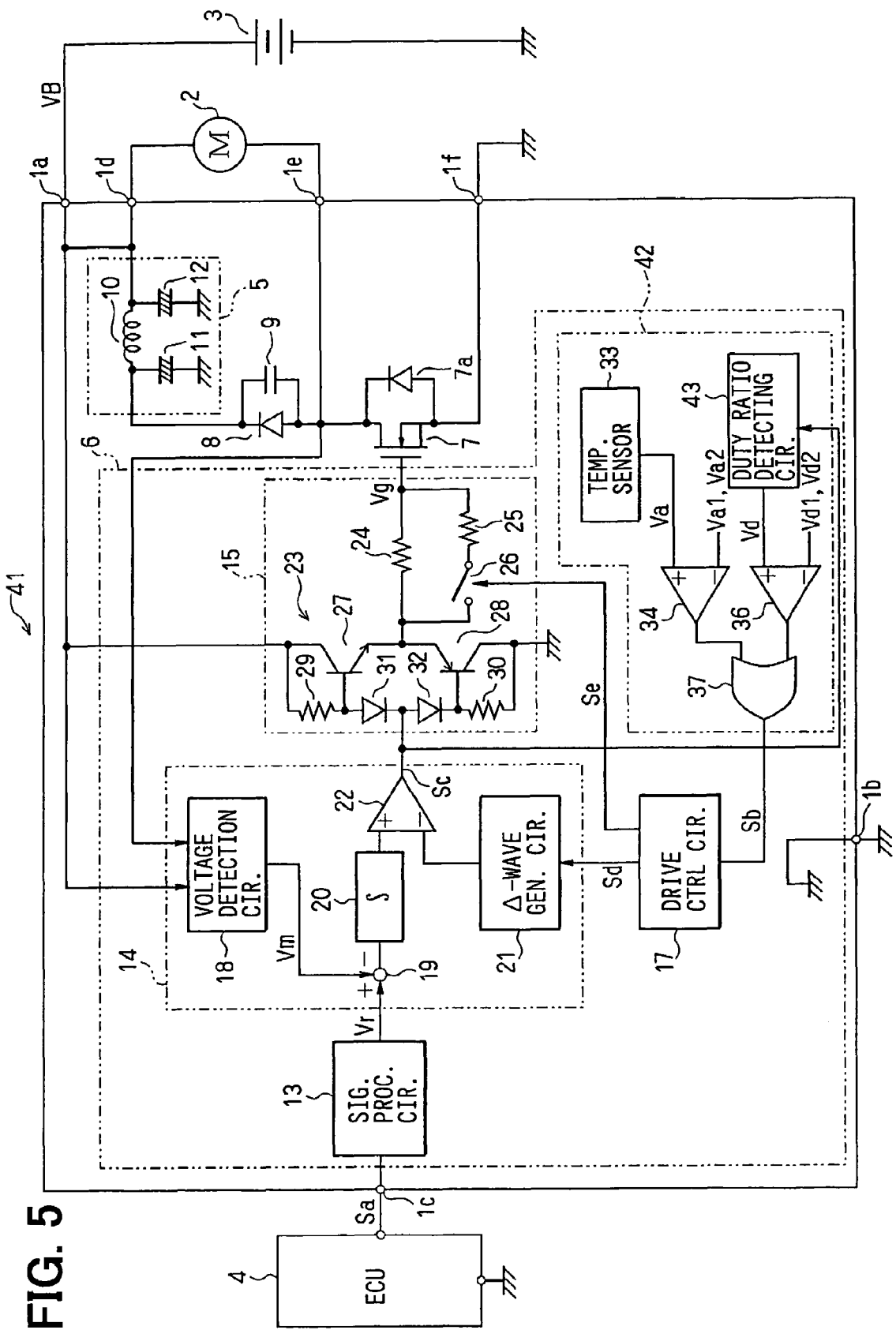
FIG. 5 is a circuit diagram of the motor driving device according to a third embodiment.

FIG. 5 shows the electrical construction of the motor driving device according to a third embodiment of the present invention. The same constituent elements as FIG. 1 are represented by the same reference numerals. The motor driving device 41 shown in FIG. 5 is different from the motor driving device 1 shown in FIG. 1 in the construction of an overheat detecting circuit 42. That is, the overheat detecting circuit 42 is equipped with a duty ratio detecting circuit 43 for detecting the duty ratio of the PWM signal Sc. The voltage Vd corresponding to the duty ratio is input to the non-inverting input terminal of the comparator 36, and threshold voltages Vd1, Vd2 are input to the inverting input terminal of the comparator 36. The threshold voltages Vd1, Vd2 correspond to the duty ratios D1, D2 (D1>D2). The motor driving device 41 may be equipped with a current detecting circuit for detecting current flowing in the MOS transistor 7 for over-current protection.

There is a general tendency that as the duty ratio is larger, the loss of the MOS transistor is increased. According to the motor driving device 41, the overheat state detecting signal Sb is set to H level to reduce the gate resistance of the driving circuit 15 and shorten the rise time tr and the fall time tf at the switching time, thereby further reducing the PWM frequency not only in the case where the overheat state of the MOS transistor 7 is detected, but also in the case where the duty ratio of the PWM signal Sc is equal to the threshold value D1 or more.

As described above, the loss of the MOS transistor 7 is reduced at the overheat pre-stage where the probability that the MOS transistor 7 is shifted to the overheat state is high, and thus the shift to the overheat state due to the increase of the power supply voltage VB can be prevented from occurring. The other operation and effect are the same as the first embodiment.

(Other Embodiments)

The present invention is not limited to the above embodiments described above with reference to the drawings, and the following modifications or expansion may be made.

For example, in order to vary the driving state of the MOS transistor 7 to control the rise time rt and the fall time tf, a method of varying the current driving capability of the push-pull circuit 23 or varying the gate voltage may be adopted in place of the method of varying the gate resistance. Furthermore, in each of the embodiments described above, the driving state of the driving circuit 15 is varied in two stages by the connection style of the gate resistors 24, 25, however, it may be varied in three stages. Furthermore, in each of the above-described embodiments, the construction for reducing the PWM frequency may be added as occasion demands.

Any one of the temperature sensor 33 and the current detecting circuit 35 may be equipped in the first embodiment, any one of the temperature sensor 33 and the power supply voltage detecting circuit 40 may be equipped in the second embodiment, and any one of the temperature sensor 33 and the duty ratio detecting circuit 43 may be equipped in the third embodiment.

The feedback control to make the motor voltage Vm coincident with the instructed motor voltage Vr may be carried out in accordance with such a situation that the variation of the power voltage VB is great or the like.

The instruction signal Sa may directly instruct the duty ratio of the PWM signal S without instructing the motor voltage.

In the third embodiment, when the instruction signal Sa directly instructs the duty ratio of the PWM signal Sc, the instruction signal Sa (a signal converted to the voltage corresponding to the duty ratio) may be directly input to the comparator 36.

The semiconductor switching element is not limited to the MOS transistor, but may be a bipolar transistor or the like.

The motor 2 is not limited to the air blowing fan motor for a heat exchanger in a cooling system for a vehicle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A motor driving circuit comprising:
   a semiconductor switching element interposed in a current flowing passage to a motor;
   a PWM control unit for generating a PWM signal having a predetermined PWM frequency;
   a driving circuit for making the semiconductor switching element carry out a switching operation under plural driving states, and driving the semiconductor switching element in PWM (Pulse Width Modulation) mode according to the PWM signal under an instructed driving state;
   an overheat state detecting unit for outputting an overheat state detecting signal on a condition that a temperature of the semiconductor switching element exceeds a predetermined threshold value and the semiconductor switching element falls into an overheat state or a state in which the probability that the semiconductor switching element will shift to the overheat state is higher than a predetermined probability; and
   a driving control unit for instructing the driving state of the semiconductor switching element to the driving circuit so that the rise time and fall time of the semiconductor switching element during an output period of the overheat state detecting signal are shorter than the rise time and fall time of the semiconductor switching element during a non-output period of the overheat state detecting signal.

2. The motor driving circuit according to claim 1, wherein the driving control unit controls the PWM control unit so that the PWM frequency during the output period of the overheat state detecting signal is lower than the PWM frequency during the non-output period of the overheat state detecting signal.

3. The motor driving circuit according to claim 1, wherein the driving circuit varies a resistance value of a resistor connected to the semiconductor switching element on the basis of an instruction from the driving control unit to thereby vary the rise time and the fall time of the semiconductor switching element.

4. The motor driving circuit according to claim 1, wherein the overheat state detecting unit includes a temperature detecting unit for detecting a temperature of the semiconductor switching element, and outputting the overheat state detecting signal during a period when the detected temperature exceeds the threshold value.

5. The motor driving circuit according to claim 1, wherein the overheat state detecting unit includes a current detecting unit for detecting current flowing in the semiconductor switching element, and outputting the overheat state detecting signal during a period when the detected current exceeds a predetermined threshold value.

6. The motor driving circuit according to claim 1, wherein the overheat state detecting unit includes a power supply voltage detecting unit for outputting the overheat state detecting signal during a period when a detected power supply voltage exceeds a predetermined threshold value.

7. The motor driving circuit according to claim 1, wherein the overheat state detecting unit outputs the overheat state detecting signal during a period when a duty ratio of PWM driving exceeds a predetermined threshold value.

8. The motor driving circuit according to claim 1, wherein the overheat state detecting unit outputs an overheat state detecting signal that has two threshold values for an output judgment of the overheat state detecting signal and is brought with a hysteresis characteristic.

9. The motor driving circuit according to claim 1, wherein the PWM control unit is equipped with a motor voltage detecting unit for detecting a voltage applied to the motor, and determines the duty ratio of the PWM signal on the basis of an instructed motor voltage and a detected motor voltage.

10. The motor driving circuit according to claim 1, wherein the motor is an air blowing fan motor for a heat exchanger in a cooling system for a vehicle.

11. The motor driving circuit according to claim 2, wherein the PWM frequency during the output period of the overheat state detecting signal is set to an audible frequency band to thereby provide human perception.

12. The motor driving circuit according to claim 2, wherein the driving circuit varies a resistance value of a resistor connected to the semiconductor switching element on the basis of an instruction from the driving control unit to thereby vary the rise time and the fall time of the semiconductor switching element.

13. The motor driving circuit according to claim 12, wherein the overheat state detecting unit includes a temperature detecting unit for detecting a temperature of the semiconductor switching element, and outputting the overheat state detecting signal during a period when the detected temperature exceeds the threshold value.

14. The motor driving circuit according to claim 12, wherein the overheat state detecting unit includes a current detecting unit for detecting current flowing in the semiconductor switching element, and outputting the overheat state detecting signal during a period when the detected current exceeds a predetermined threshold value.

15. The motor driving circuit according to claim 12, wherein the overheat state detecting unit includes a power supply voltage detecting unit for outputting the overheat state detecting signal during a period when a detected power supply voltage exceeds a predetermined threshold value.

16. The motor driving circuit according to claim 12, wherein the overheat state detecting unit outputs the overheat state detecting signal during a period when a duty ratio of PWM driving exceeds a predetermined threshold value.

17. The motor driving circuit according to claim 12, wherein the PWM control unit is equipped with a motor voltage detecting unit for detecting a voltage applied to the motor, and determines the duty ratio of the PWM signal on the basis of an instructed motor voltage and a detected motor voltage.

18. The motor driving circuit according to claim 2, wherein the driving circuit, under instruction from the driving control unit, lowers a resistance value of a gate resistance connected to the semiconductor switching element such that the lower resistance value of the gate resistance lowers a charge time associated with a gate capacitance of the semiconductor switching element to lower the rise time and the fall time of the semiconductor switching element during the output period of the overheat state detecting signal.

* * * * *